United States Patent [19]
Delange

[11] Patent Number: 5,031,226
[45] Date of Patent: Jul. 9, 1991

[54] ARRANGEMENT FOR DETERMINING CONTRASTING OBJECTS IN A PICTURE

[75] Inventor: Christophe Delange, Paris, France

[73] Assignee: U.S. Philips Corporation, New York, N.Y.

[21] Appl. No.: 378,880

[22] Filed: Jul. 12, 1989

[30] Foreign Application Priority Data

Jul. 12, 1988 [FR] France ................. 8809465

[51] Int. Cl.⁵ .............................................. G06K 9/00
[52] U.S. Cl. ........................................ 382/22; 382/16; 382/25; 382/52
[58] Field of Search ..................... 382/16, 22, 25

[56] References Cited

U.S. PATENT DOCUMENTS

| | | | |
|---|---|---|---|
| 4,747,150 | 5/1988 | Knutsson et al. | 382/22 |
| 4,817,174 | 3/1989 | Nakatani | 382/22 |
| 4,896,364 | 1/1990 | Lohscheller | 382/22 |

Primary Examiner—Leo H. Boudreau
Assistant Examiner—Dan Santos
Attorney, Agent, or Firm—Michael E. Marion

[57] ABSTRACT

This arrangement comprises at least a processing block (2) provided with mean value calculating members for calculating for each picture element different mean background values (16, 18, 20), a contrast measuring member (22) for producing a deviation value between the mean values and the luminance L(i, j) of the picture element to be processed, a comparator (30) for producing the indication of the contrasting object by comparing the different deviation values to at least one predetermined threshold value and a background value assigning member (55) for assigning a background value for each picture element on the basis of said mean values. The mean value calculating members (16, 18, 20) are formed from first storing means (95, 82) for storing a previous value of the mean value calculated for the preceding picture element, second storage means for the background values already assigned (80, 90, 100) and add-subtract means (84, 86, 92, 102) for producing the mean value for each picture element from the mean value contained in the first storage means and the background values contained in the second storage means.

2 Claims, 5 Drawing Sheets

ARRANGEMENT FOR DETERMINING CONTRASTING OBJECTS IN A PICTURE

BACKGROUND OF THE INVENTION

The present invention relates to an arrangement for determining contrasting objects in a picture, the arrangement comprising an input for receiving video signal samples each of which represents the luminance of a picture element and whose order of appearance is given by a horizontal scan in combination with a vertical scan, a first output for supplying background values relating to each picture element, a second output for supplying the indication that the picture element belongs to a contrasting object, at least a processing block provided with members for mean value calculation for calculating for each picture element different mean values of the background values, a contrast measuring member for producing a deviation value between the mean values and the luminance of the picture element, a comparator member for producing said indication by comparing the different deviation values to at least a predetermined threshold value and a background value assigning member for assigning a background value for each picture element on the basis of said mean values.

Such an arrangement is used with great advantage for, for example, recognizing preferred targets in a landscape, as is described in the article "Autothreshold-Autoscreener/ELIR System" presented at NEACON 78 and published by IEEE CH 1336-7/78/0000, pp. 1180-1185, or for recognizing shapes as described in the article by J-M. Zurcher "Extraction de contours en traitement électronique des images: II-processeur spécialisé pour signal vidéo", published in the BULLETIN DE L ASSOCIATION SUISSE DES ELECTRICIENS, vol. 70, no. 11, June 1979, pp. 532-536, Zürich (CH).

In Applicant's French Patent Application FR-A 2,602,387 (U.S. Ser. No. 079,549, filed July 29, 1987) an arrangement is described now U.S. Pat. No 4,809,349, issued Feb. 28, 1989 which puts into effect a particularly efficient method for this type of application. However, the arrangement described is not suitable for processing pictures in real time.

SUMMARY OF THE INVENTION

The invention comprises such an arrangement which is suitable for processing pictures in real time and is characterized, in that the mean value calculating members include first storage means for storing a previous value of the mean value calculated for the preceding picture element, second means for storing the already assigned background values and add-subtract means for producing the mean value for each picture element from the mean values stored in the first storage means and background values stored in the second storage means.

BRIEF DESCRIPTION OF THE DRAWINGS

The following description which is given by way of non-limitative example with reference to the accompanying drawings will make it better understood how the invention can be put into effect.

DETAILED DESCRIPTION OF THE INVENTION

Figure 1:
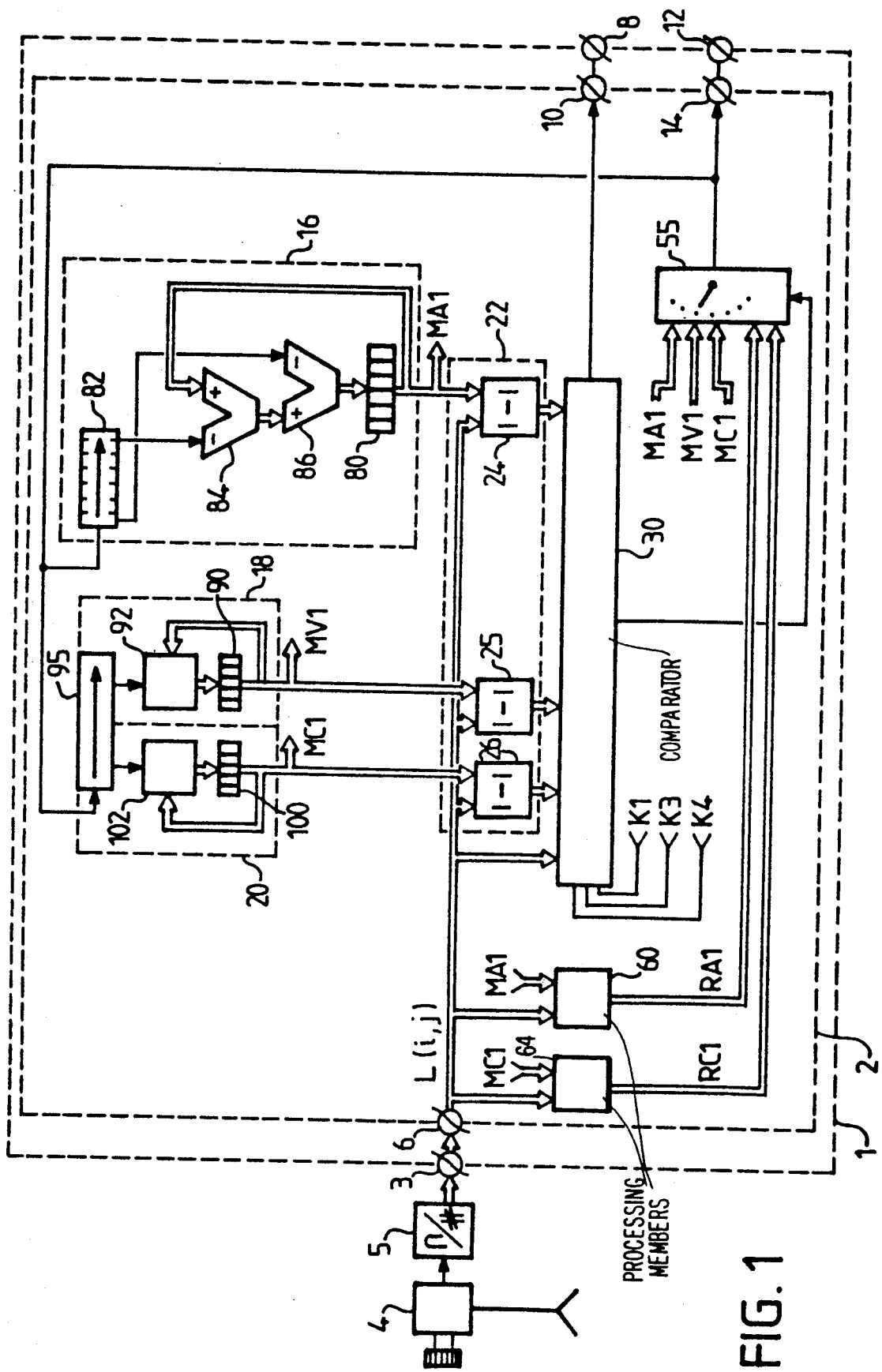
FIG. 1 shows a first arrangement according to the invention.

In FIG. 1, the arrangement for recovering contrasting objects is denoted by reference numeral 1. It is comprised of one single processing block 2. The input 3 of the arrangement 1 is connected to a camera 4 via an analog-to-digital converter 5. The input 6 of the block 2 constitutes the input 3 of the arrangement.

Figure 2:
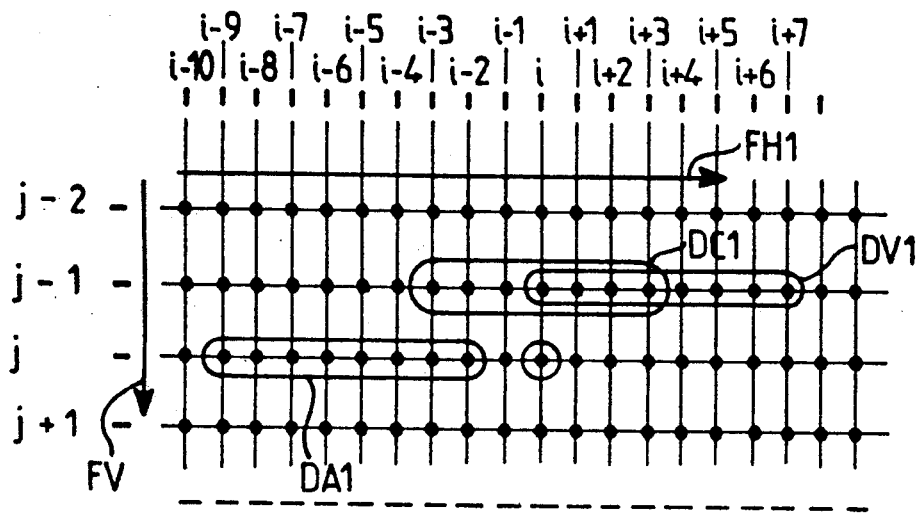
FIG. 2 shows the distribution of the picture elements of which different mean values are calculated.

FIG. 2 shows how the pictures are analysed. Each picture is divided into lines . . . j−2, j−1, j, j+1, . . . from top to bottom as indicated by the vertical arrow FV and each line is divided into picture elements . . . , i−10, . . . , i−3, i−2, i−1, i, i+1, i+2, . . . , i+7 . . . , from left to right as is indicated by the horizontal arrow FH1. The luminance of each element i, j is represented by, for example, an 8-bit digital sample $L(i, j)$. To put the method described in the said patent application Ser. No. FR-A 2,602,387 (U.S. Pat. No. 4,809,349) and which will be recalled in the sequel, into effect, it is necessary to calculate different mean background values which appear at an output terminal 12 of the arrangement, which output terminal also constitutes the terminal 14 of the block 2, which values consequently have already been calculated by the arrangement 1.

For the current picture element i, j which is surrounded by a circle in FIG. 2 these mean values are:

the leading mean value MV1 relating to the picture elements of a field DV1 comprising the elements i, i+1, . . . , i+7 of the line j−1 the central mean value MC1 relating to the elements of a field DC1 comprising the elements i−3, . . . , i, . . . , i+3 of the line j−1 the rear mean value MA1 which relates to the elements of a field DA1 comprising the elements i−9, . . . , i−2 of the line j.

The indication that an element belongs to a contrasted object is made available at a terminal 8 of the arrangement, which also constitutes the terminal 10 of the block 2. Mean value calculating members are provided for calculating these different mean values. An upstream mean value calculating member 16 for producing the upstream mean value MA1, a downstream mean value calculating member 18 for producing the downstream mean value MV1 and a central mean value calculating member 20 for producing the central mean value MC1. Only the member 16 is shown in detail in FIG. 1. A contrast measuring member 22 compares the value of the means MA1, MV1 and MC1 with the luminance $L(i, j)$. This member 22 takes the differences, in an absolute value, of the luminance and the different means MA1, MV1 and MC1 by means of the members 24, 25 and 26. A comparator member 30 effects different comparisons between the values produced by 30, the luminance and different threshold values K1, K3 and K4. This comparator member 30 supplies from its output 10 the indication that a contrasted object is involved. This member 30 which cooperates with an assigning member 55 also determines the value of the background F1(i, j) to be assigned to the element (i, j).

For this purpose the member 30 processes a switching code for the assigning member 55 which is constituted by a multiplexer; this multiplexer has inputs for receiving the respective mean values MA1, MV1, MC1, the luminance value L(i, j) and the updating values RA1 and RC1 produced by the members 60 and 64 which process the respective values $\frac{1}{2}[L(i, j)+MA1]$ and $\frac{1}{2}[L(i, j)+MC1]$.

In accordance with a characteristic feature of the invention, the upstream mean value calculating member 16 is formed by a first storage means constituted by an adder register 80 containing the previous mean value, a second storage means constituted by a shift register 82 containing background values already determined and add-subtract means constituted by a subtractor 84 and an adder 86 for adding and subtracting, in an algebraic value, different background values made available by the register 82 with the previous value of the means contained in the register 80.

Figure 3:
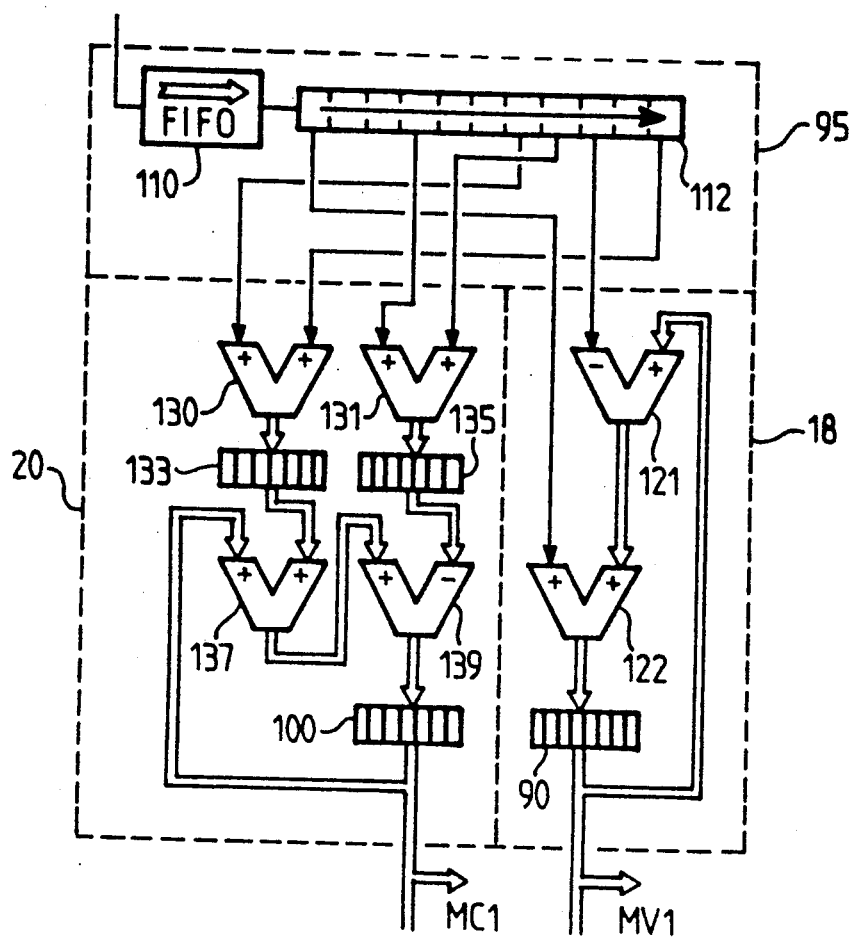
FIG. 3 shows the structure of the mean value calculating members.

In a similar manner, the upstream mean value calculating member 18 is formed by an adder register 90 containing already a previous value and add-subtract means 92 to take the algebraic sum of different quantities coming from the register 90 and a second storage means 95 which is used jointly with the central mean value calculating member 20. This member 20 also includes an adder register 100 cooperating with add-subtract means 102. The members 18 and 20 are shown in greater detail in FIG. 3.

The second jointly used storage means 95 are formed by a memory FIFO 110 followed by a shift register 112 which has for its object to make the digital samples of the background available useful for the mean value calculations. The calculating member 18 has the same structure as the member 16. The add-subtract means are formed by a subtractor 121 and an adder 122 for adding, in an algebraic value, different background values made available by the register 112 to the previous value of the mean contained in the accumulation register 90.

The calculation member 20 is formed first of all by two adders 130 and 131 arranged for adding different values coming from the shift register 112 together in an algebraic value. The results of these adders are stored in the registers 133 and 135. A further adder 137 adds the result contained in the register 133 to the previous value of the mean stored in the memory 100. A subtractor 139 subtracts the value stored in the register 135 from the result produced by the adder 137. The result of 139 constitutes the new value to be stored in the register 100. It should be noted that this member 20 operates with an extra pipeline stage (the registers 133 and 135) compared with the members 16 and 12.

Figure 4:
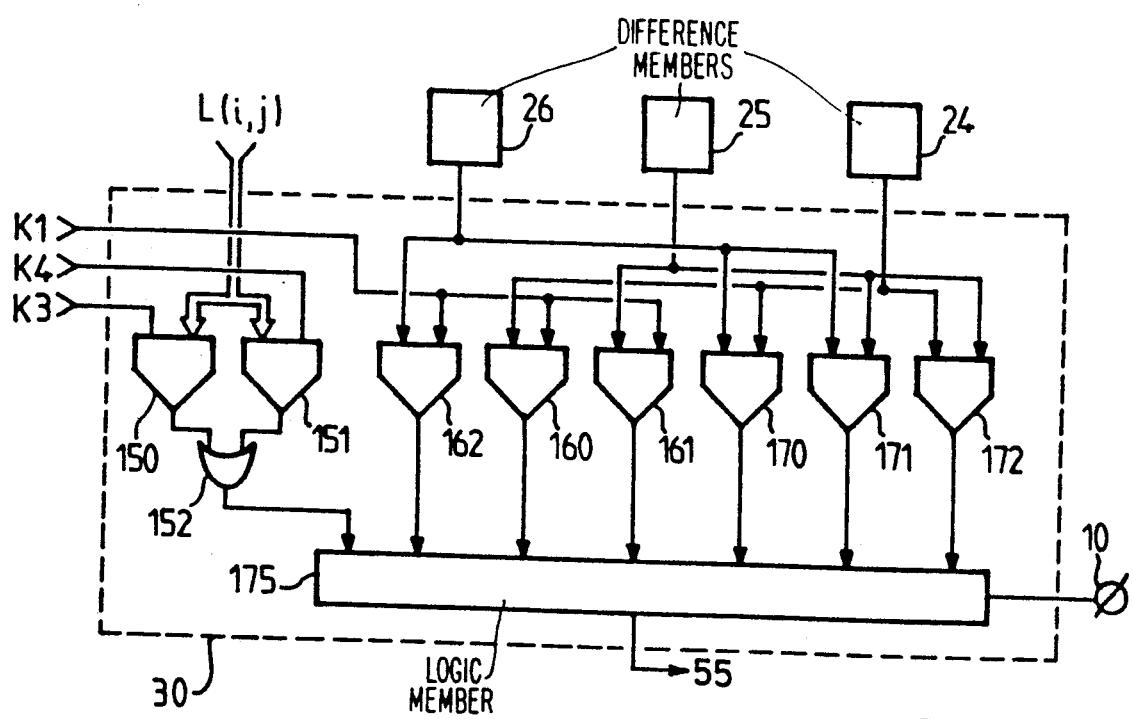
FIG. 4 shows the structure of a comparator member.

The comparator member 30 is shown in detail in FIG. 4. It comprises a first set of comparators 150 and 151 for comparing the luminance value L(i, j) with two threshold values K3 and K4. An OR-gate 152 combines the results of these comparators to supply a logic "1" when the signal L(i, j) is comprised between these two values or not. A second set formed by the comparators 160, 161 and 162 compares the results produced by the difference-producing members 24, 25 and 26, respectively, to a threshold value K1. A third set of comparators 170, 171 and 172 compares two-by-two the results of the members 24, 25 and 26. The member 170 compares the results of 24 and 26, the member 171 compares the results of 25 and 26, and the member 172 compares the results of 24 and 25.

A logic member 175 receiving the result from all these comparisons produces the indication whether they are intended for the terminal 10 and also processes the switching code for the assigning member 55.

It is now possible to explain the mode of operation of the arrangement of FIG. 1.

The upstream mean value calculating member 16 must effect, in accordance with the embodiment described, the following calculation for every element (i, j):

$$MA1(i,j) = \frac{1}{8} \sum_{n=2}^{9} F1(i - n, j) \tag{1}$$

The downstream mean value calculating member 18 effects the calculation:

$$MV1(i,j) = \frac{1}{8} \sum_{n=0}^{7} F1(i + n, j - 1) \tag{2}$$

The central mean value calculating member 20 effects the calculation:

$$MC1(i,j) = \frac{1}{8}\left[\sum_{n=-3}^{-1} F1(i + n, j - 1) + 2 \cdot F1(i, j - 1) + \sum_{n=1}^{3} F1(i + n, j - 1)\right] \tag{3}$$

Formula (3) indicates that the central pixel (or picture element) is given a double weight.

To avoid excessively long calculation times, the invention proposes to avoid as much as possible successive adding operations as the adders and subtractors take too much time for the calculation. The formula (1) is performed in the following manner by the member 16.

The subtractor 84 effects the following operation:

$$8 \cdot MA1(i-1,j) - F1(i-10,j)$$

and the adder 86 adds the value F1(i−2, j) to this result, so that the formula (1) can be written:

$$MA1(i,j) = \frac{1}{8}[8 \cdot MA1(i-1,j) - F1(i-10,j) + F1(i-2,j)] \tag{4}$$

It will be obvious that the multiplications by 8 and by $\frac{1}{8}$ are simply effected by wiring and do not take any operating time.

Similarly, as regards the formula (2), a subtractor 121 performs:

$$8 \cdot MV1(i-1,j) - F1(i-1,j-1)$$

and the adder 122 adds +F1(i+7, j−1) to this result, the formula (2) is then written:

$$MV1(i,j) = \frac{1}{8}[8 \cdot MV1(i-1,j) - F1(i-1,j-1) + F1(i+7,j-1)] \tag{5}$$

Because of the additional pipe-line stage, the mode of operation of the member 20 is a little more complicated.

To calculate the mean MC1(i, j) the accumulation register 100 must contain MC(i−1, j) and the registers 133 and 135 must contain the quantities QP(i) and QM(i) such as:

$$QP(i) = F1(i+3, j-1) + F1(i, j-1)$$

$$QM(i) = F1(i-4, j-1) + F1(i-1, j-1)$$

so that (3) can be written:

$$MC1(i,j) + \frac{1}{8}[8.MC1(i-1,j) + QP(i) - QM(i)]$$

It should be noted that the quantities which are necessary to calculate the quantities QP(i+1) and QM(i+1) are available at the outputs of the adders 130 and 131, that is to say:

$$QP(i+1) = F1(i+4, j-1) + F1(i+1, j-1)$$

$$QM(i+1) = F1(i-3, j-1) + F1(i, j-1)$$

The following Tables I and II summarize the function of the arrangement in accordance with the invention by giving the elements which are necessary to provide the logic member 175.

TABLE I

| 152 | 160 | 161 | 162 | 10 |
|---|---|---|---|---|
| 0 | 1 | 1 | 1 | 1 |
| 1 | 1 | 1 | 1 | 0 |
| X | 0 | X | X | 0 |
| X | X | 0 | X | 0 |
| X | X | X | 0 | 0 |

TABLE II

| 152 | 170 | 171 | 172 | 55 |
|---|---|---|---|---|
| 1 | 1 | 1 | X | MC1 |
| 1 | X | 0 | 0 | MV1 |
| 1 | 0 | X | 1 | MA1 |
| 0 | 1 | X | 0 | RA1 |
| 0 | 0 | 0 | X | RC1 |

The digit "1" indicates for the comparators 160, 161 and 162 that K1 exceeds the values applied to their other inputs. As regards 170, 171, 172, the digit "1" signifies that:

$$|MA1 - L(i,j)| > |MC1 - L(i,j)|$$

$$|MV1 - L(i,j)| > |MC1 - L(i,j)|$$

$$|MV1 - L(i,j)| > |MA1 - L(i,j)|$$

The symbol "X" indicates either 1 or 0.

The digit "1" in the column relating to terminal 10 indicates that the current element belongs to a contrasted object.

In the Table II, the column relating to the member 55 indicates the switching operation effected.

Figure 6:
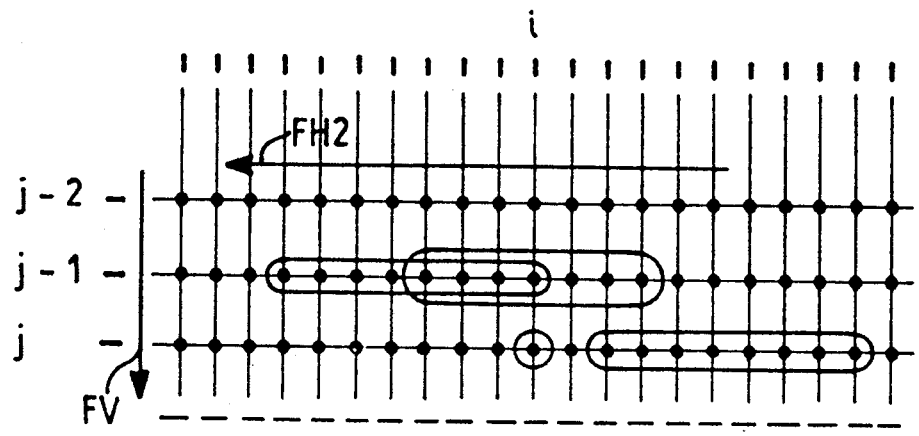
FIG. 6 shows the distribution of the picture elements of which different mean values are calculated.
Figure 5:
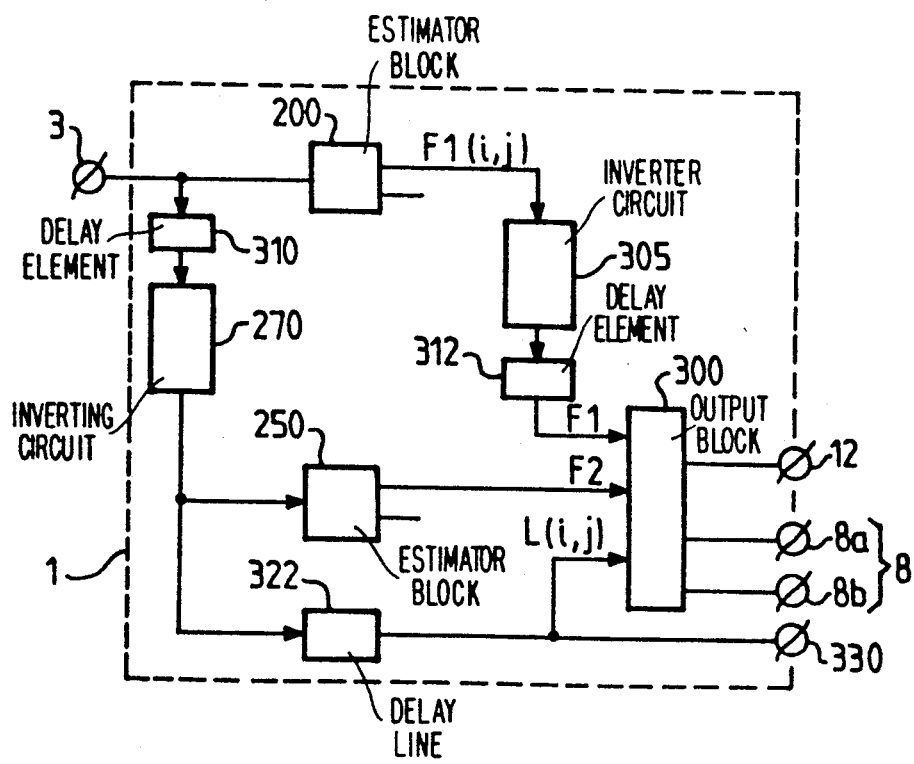
FIG. 5 shows a second arrangement according to the invention.

FIG. 5 shows the preferred embodiment of the arrangement 1 according to the invention. This arrangement puts into effect the sequential processing of the elements in accordance with the direction of scan of the camera, which is indicated by the arrow FH1 in FIG. 2 and also the processing effected in the opposite direction, which is indicated by the arrow FH2 in FIG. 6. It will be remembered that this duel processing is suggested in said patent application Ser. No. FR-A 2,602,387, U.S. Pat. No. 4,809,349.

The arrangement of FIG. 5 comprises a first estimator block 200 which has already been described with reference to FIG. 1 and a second block 250 of an identical structure. The block 200 effects the processing in the direction FH1 and to that end its input is connected directly to the input 3. The block 250 effects the processing in the opposite direction, that is to say in accordance with the direction FH2 and to that end its input is connected to the output of a picture element inverting circuit 270 constituted by a memory of the LIFO type which is connected to the input 3 and consequently inverts the direction of the elements of a line.

An output block 300 supplies the most appropriate background value from the output 12 and from its second outputs 8a and 8b it provides the indication that the processed element is a target (output 8a) or not and furthermore provides an indication of the nature of the target (whether it is brighter or not so bright, warmer or not so warm as the background), (output 8b). So as to enable the output block 300 to process the elements in a coherent manner, a further picture element inverter circuit 305 is provided between the output of the block 200 and the associated input of the block 300. Different delay elements 310 and 312 are added to the input of the circuit 270 and to the output of the circuit 305 so as to take the different processing durations into account. A first background value F1 is obtained at the output of the delay element 312 and at the output of the block 250 a second background value F2, which are both applied to the inputs of the block 300, accompanied by the luminance value L(i, j) obtained from the output of a delay member 322. The arrangement of FIG. 5 may further have an output 330 connected to the output of the memory 270 via the delay line 322.

Figure 7:
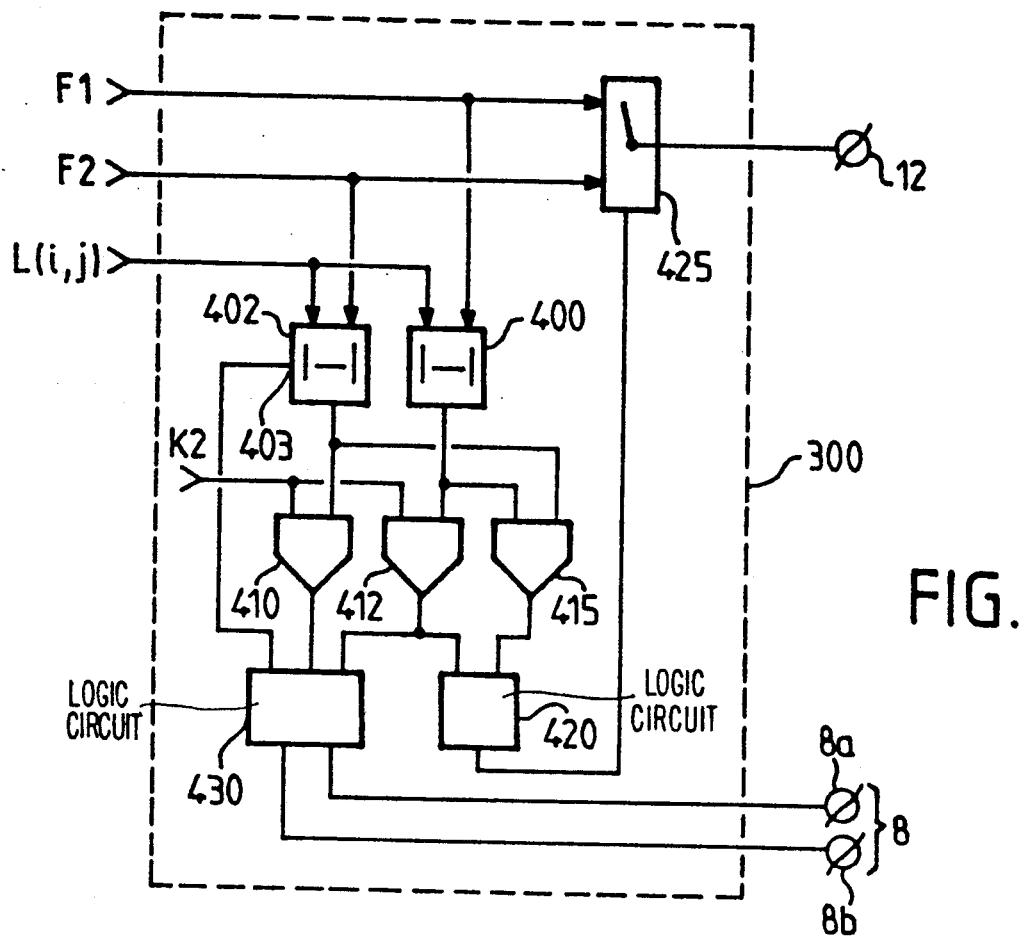
FIG. 7 shows the structure of an output block.

FIG. 7 is a detailed representation of the structure of the output block 300.

It is first of all comprised of two difference members 400 and 402 which give the absolute value of the difference between F1(i, j) and the luminance signal for the first member and the difference between F2 and the same luminance signal for the second member. The member 402 has an output 403 to give the sign of this difference. These difference values formed by the respective members 400 and 402 are compared by means of the comparators 410 and 412, respectively, to a predetermined threshold value K2. A third comparator 415 compares the values produced by these members 400 and 402. A first logic circuit 420 receiving the signal from the comparator 415 produces a control signal for a multiplexer 425 so as to provide that one of the backgrounds F1 and F2 is the background retained at the output. A second logic circuit 430 produces from the signals originating from the output 403, and from the comparators 410 and 412 the signals which are indicative of the target and the sign of their contrast in the background.

The mode of functioning of the circuit 420 is summarized in the following Table III, and the mode of functioning of the circuit 430 is summarized in the Table IV.

TABLE III

| 415 | 425 |
|---|---|
| 1 | F1 |
| 0 | F2 |

TABLE IV

| 403 | 410 | 412 | 8a | 8b |
|-----|-----|-----|----|----|
|     | 1   | 1   | 1  | 1  |
| 1   | 1   | 0   | 1  | 1  |
|     | 0   | 1   | 1  | 1  |
|     | 1   | 1   | 1  | 0  |
| 0   | 1   | 0   | 1  | 0  |
|     | 0   | 1   | 1  | 0  |
| X   | 0   | 0   | 0  | X  |

The sign "1" at the output 8a indicates that the element belong to an object which has a greater contrast than its environment.

The sign "1" at the output 8b indicates that the element belongs to an object which is brighter than its environment.

The sign "0" at the output 8b indicates that the element belongs to an object which is dark compared with its environment.

The sign "1" from the comparator 415 indicates:

$$|F1(i,j) - L(i,j)| < |F2(i,j) - L(i,j)|$$

The sign "1" at the output 403 indicates:

$$(i,j) - F1(i,j) > 0$$

The sign "1" at the output of the comparator 410 indicates:

$$|F2(i,j) - L(i,j)| > K2$$

The sign "1" at the output of the comparator 412 indicates:

$$|F1(i,j) - L(i,j)| > K2$$

Figure 8:
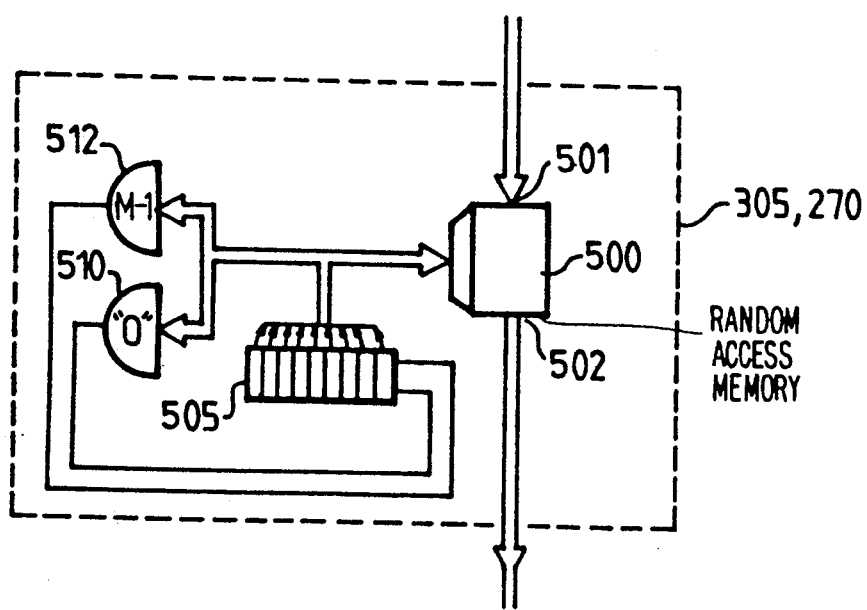
FIG. 8 shows the structure of an inverter circuit.

FIG. 8 shows in detail the structure of a picture element inverter circuit 270-305. It is formed from a random-access memory 500. This memory may be of a type having two access ports 501 and 502, as shown in FIG. 8. However, an obvious possibility is to use instead a memory having one single access port and to provide a multiplexing management for the access of the entering data and the data outgoing from the memory. The first access port 501 receives the data to be written, the second access port 502 furnishes the data taken from the memory. This memory is addressed by an up/down counter 505 which counts up from 0 to $M-1$ and counts down from $M-1$ to 0, M being the number of picture elements per line. Two decoders 510 and 512 are connected to this counter. The decoder 510 produces an active signal when the content of the up/down counter passes to zero to adjust it to the counting position. The decoder 512 produces an active signal when its content $(M-1)$ is at a maximum to adjust it to the down-counting position. It should be noted that the memory 500 can have enough input and output lines to enable inversion of the information components originating from the block 200 and the video information components.

Figure 9:
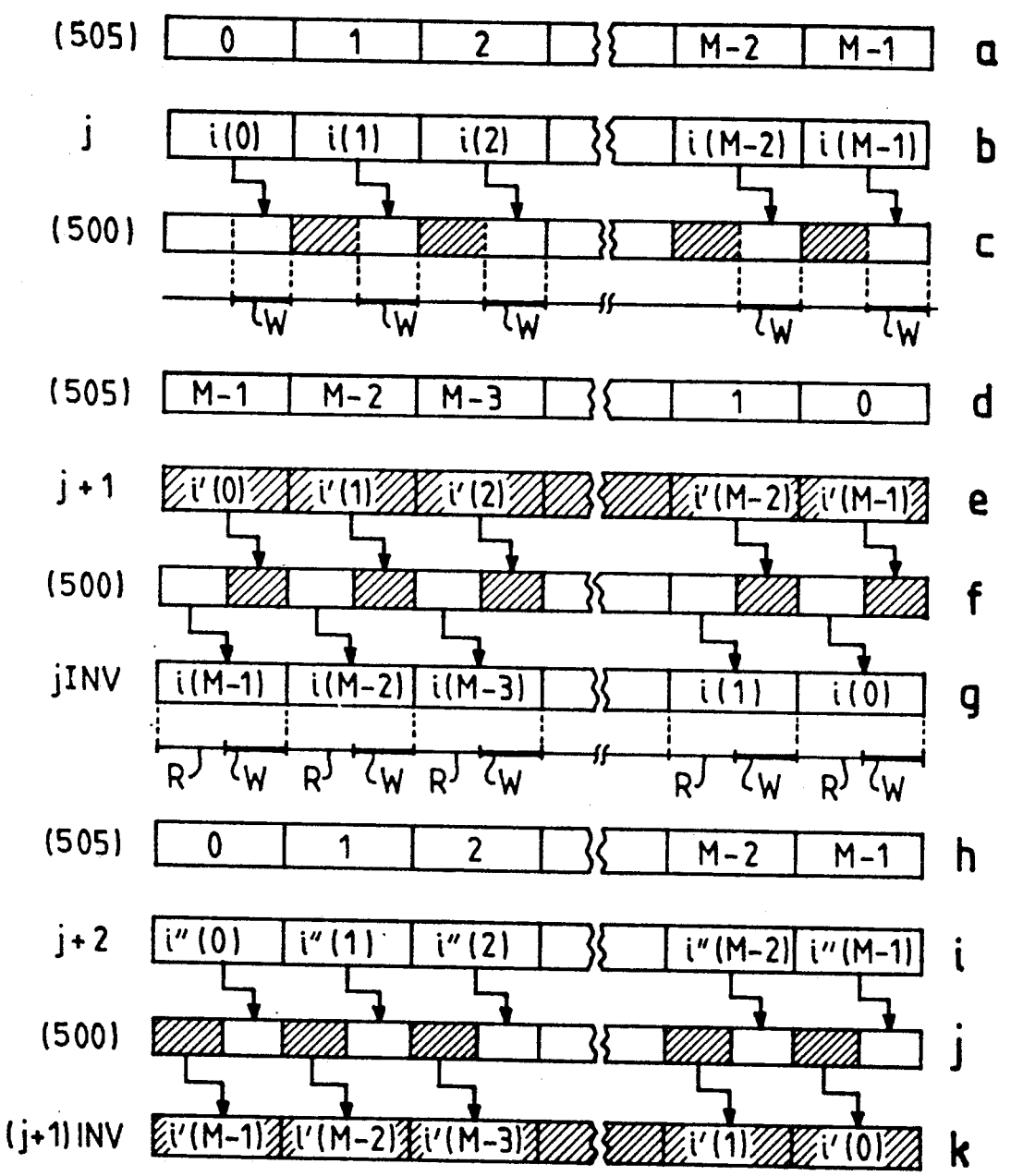
FIG. 9 is a circuit diagram to explain the mode of operation of this circuit.

FIG. 9 shows how such an inverter circuit inverts, versus time, the data applied to it. The line a represents the development of the content of the counter 505 which is in the counting position, its contents then develops from 0 to $M-1$. The line b represents the data i(n) relating to the picture elements of a line j, its contents develops from 0 to $m-1$. At instants W the memory 500 is then filled with data i(0) to i(m−1) for the content of the up/down counter ranging from 0 to $m-1$. This is shown in line c.

The contents of the up/down counter 505 develops for the subsequent line in the opposite sense, that is to say from $M-1$ to 0, (line d). The data i'(m) of the subsequent line $j+1$ always develops in the same sense, m going from 0 to $M-1$ (see line e) so that the data i'(0) will be written at the address $M-1$ at the instant W. But these instants W are preceded by read times R so that at the output 502 the data i(M−1) will be recovered. Thus, the data relating to the line j will appear in the sequence i(M−1), i(M−2), . . . , i(0), consequently inverted INV (line f) while the data from the line $j+2$ will be stored in the normal sequence i'(0), i'(1), . . . , i'(M−1). When all these data have been stored, the up/down counter 505 will be reset to the counting position (line b) while the data relating to the line $j+2$ will be available at the input 501 to be stored there (line i). At the output 502 the data relating to the line $j+1$ in the inverted sequence INV i'(M−1), i'(M−2), . . . , i'(0) are available.

I claim:

1. An arrangement for determining contrasting objects in a picture, the arrangement comprising an input for receiving video or signal samples each of which represents the luminance of a picture element and whose order of appearance is given by a horizontal scan in combination with a vertical scan, a first output for supplying background values relating to each picture element, a second output for supplying the indication that the picture element belongs to a contrasting object, at least a processing block provided with members for mean value calculation for calculating for each picture element different mean values of the background values, a contrast measuring member for producing a deviation value between the mean values and the luminance of the picture element, a comparator member for producing said indication by comparing the different deviation values to at least a predetermined threshold value and a background value assigning member for assigning a background value for each picture element on the basis of said mean values, characterized in that the mean value calculating members include first storage means for storing a previous value of the mean value calculated for the preceding picture element, second means for storing the already assigned background values and add-subtract means for producing the mean value for each picture element from the mean value stored in the firs storage means and background values stored in the second storage means.

2. An arrangement for determining contrasting objects as claimed in claim 1, characterized in that it comprises a first processing block for processing the samples appearing in said sequence and for producing a first background value, an inverter circuit for inverting said sequence, a second processing block for processing the samples at the output of the sequence inverting circuit and for producing a second background value, and an output block for producing said indication and also for producing one of the first or second background values.

* * * * *